Figure 3:
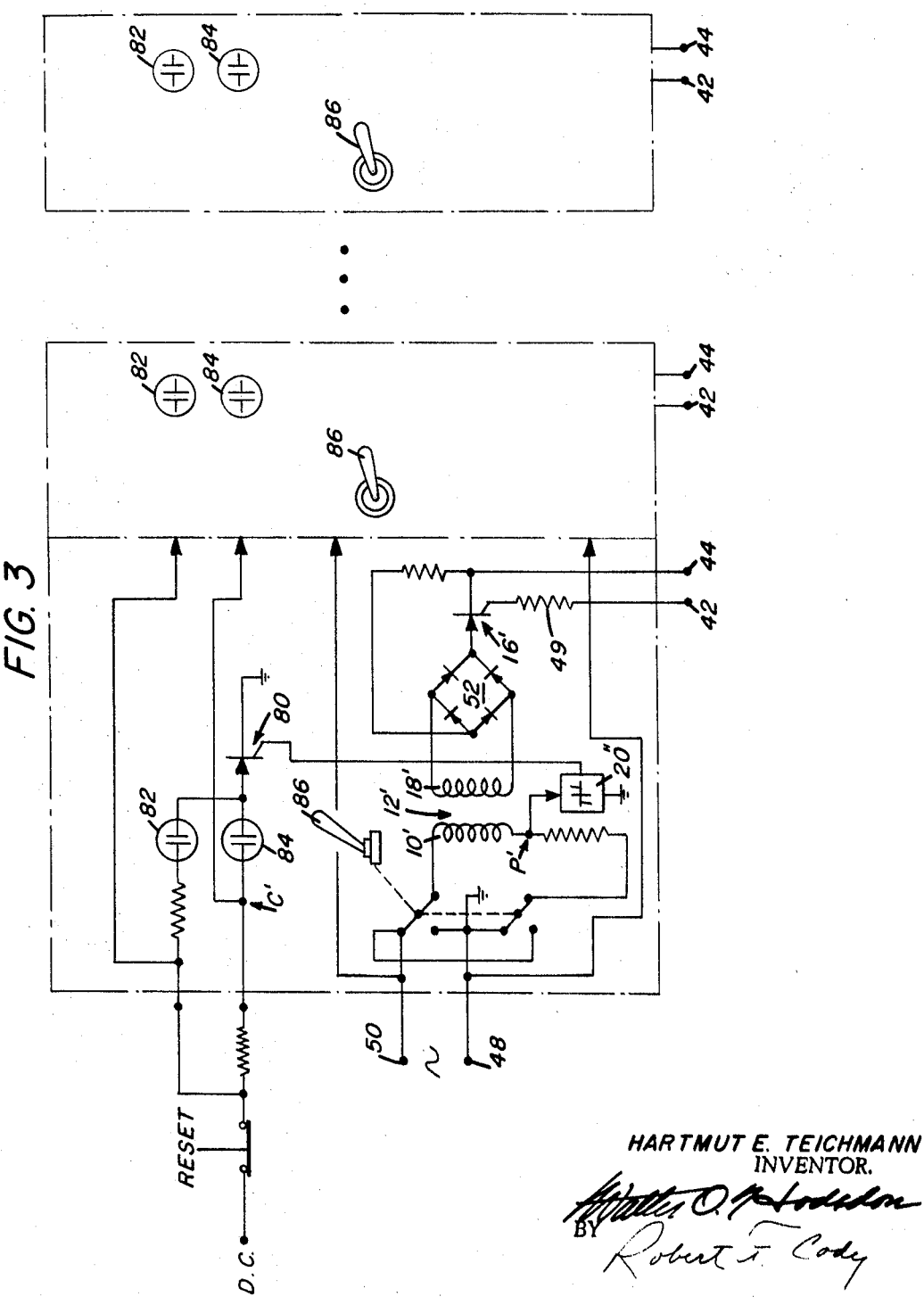

United States Patent

[11] 3,587,096

| [72] | Inventor | Hartmut E. Teichmann |
| | | Rochester, N.Y. |
| [21] | Appl. No. | 766,773 |
| [22] | Filed | Oct. 11, 1968 |
| [45] | Patented | June 22, 1971 |
| [73] | Assignee | Eastman Kodak Company |
| | | Rochester, N.Y. |

[54] MONITOR CIRCUIT APPARATUS
6 Claims, 3 Drawing Figs.

[52] U.S. Cl. .................................................. 340/412,
328/150, 307/88
[51] Int. Cl. ..................................................... G08b19/00,
H03k 17/30, H03k 17/80
[50] Field of Search ............................................ 328/150;
340/172, 213, 415, 412; 307/88

[56] References Cited
UNITED STATES PATENTS

| 3,134,910 | 5/1964 | Bassett, Jr. ..................... | 307/88 |
| 3,500,469 | 3/1970 | Plambeck et al. ............. | 340/415 X |
| 3,505,664 | 4/1970 | Morris .......................... | 340/415 X |

*Primary Examiner*—Stanley M. Urynowicz, Jr.
*Attorneys*—Walter O. Hodsdon, Paul R. Holmes and Robert F. Cody

ABSTRACT: The disclosure relates to a circuit for use in checking whether a switch circuit is normally disposed. The circuit employs a control rectifier to vary the impedance reflected into a transformer primary winding by a secondary winding thereof, which reflected impedance determines the quotient signal developed by means of the transformer primary winding in combination with another impedance. The quotient signal, depending on its magnitude, actuates, or not, a threshold detector; and the control rectifier is turned on, or off, by means of the switch circuit being monitored.

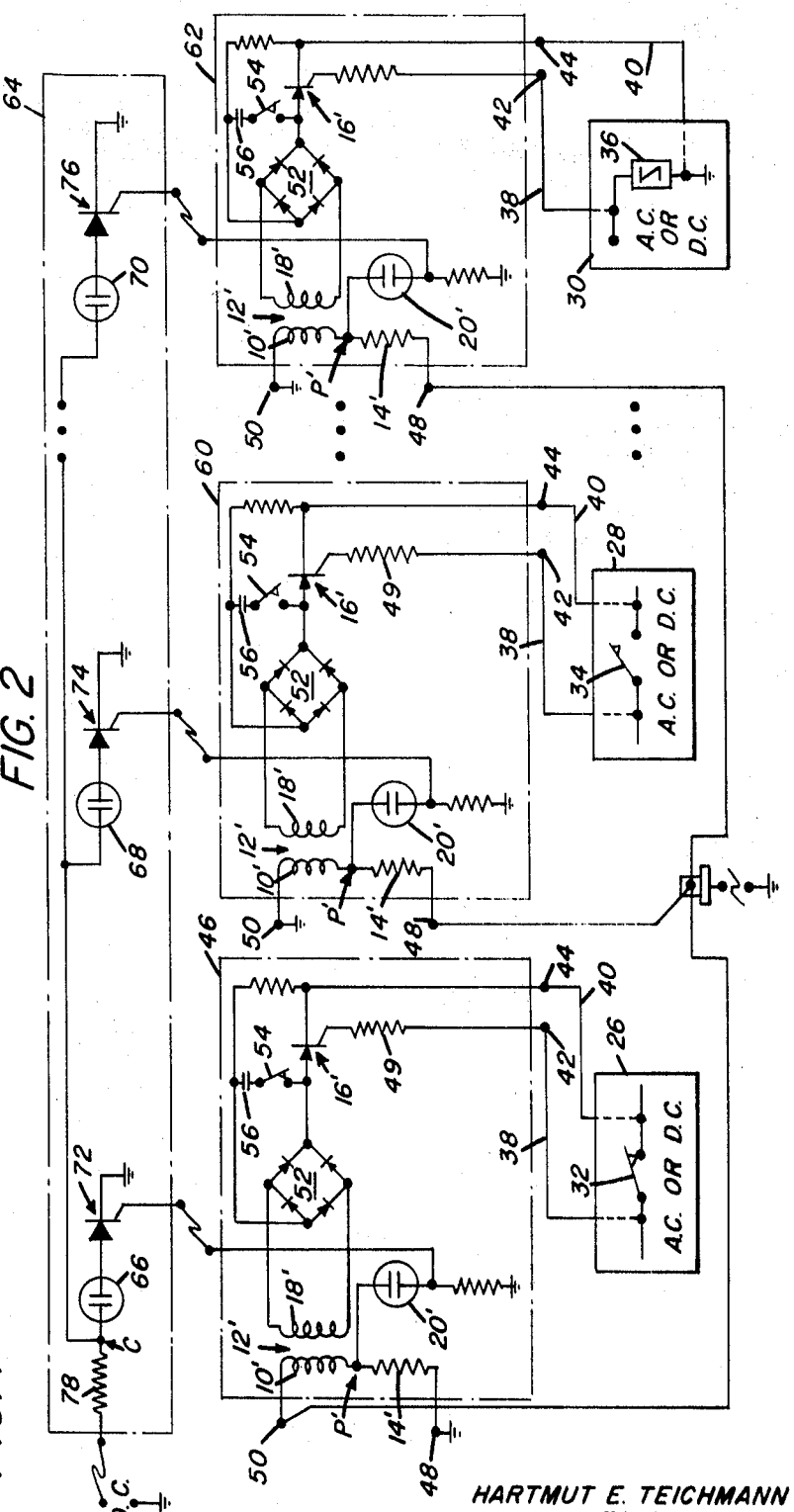

HARTMUT E. TEICHMANN
INVENTOR.

BY
Robert F. Cody

ATTORNEYS 3,587,096

MONITOR CIRCUIT APPARATUS

BACKGROUND OF THE INVENTION

1. Field of the Invention

This invention relates in general to inductively reactive circuits. A presently preferred environment for the invention is in a circuit for monitoring the operation of another circuit. A plurality of circuits according to the invention may be employed to monitor, for example, the operation of respective switches, whether such switches are respectively normally open or closed, and whether AC or DC signals are respectively applied across or through such switches.

2. Description Relative to the Prior Art

Prior art monitoring circuits are best characterized as being either or both "special purpose" or relatively expensive. It is submitted that there are no special tricks in providing a prior art monitoring circuit for checking whether, say, a normally closed DC-carrying switch is open or closed; or whether a normally open switch, across which an AC signal is applied, is open or closed, etc. It is not, however, readily apparent how an inexpensive circuit for preforming either of the above-noted jobs (or others) may be provided.

A typical use for apparatus according to the invention is in monitoring a manufacturing process which employs respective control consoles for the various stages of the manufacturing process, such consoles being electrically isolated from each other, but being perhaps dependent on each other for their own continued operation. Consoles, so arranged, may be likened to an array of switches each of which may depend on the others for its actuation. It is desired to hook a respective monitor circuit across each such "switch" and to determine whether such switch is normally disposed; and it is desired that each monitor circuit not only be electrically isolated from the respective switch which it is monitoring, but also that each monitor circuit not disturb the electrical isolation which may exist between the switches. And, if more than one of such switches becomes abnormally disposed, it is desired to determine which of such switches was the first to become abnormally disposed. While such a function has already been suggested in the prior art, the invention, as will be indicated below, provides an improved way for providing a first-to-fail indication; that is, the invention in its preferred form so incorporates a first-to-fail feature that further circuit standardization and still greater circuit versatility are provided.

SUMMARY OF THE INVENTION

Apparatus according to the invention requires a transformer, a noncapacitive impedance, i.e. a resister, in series with the primary winding of the transformer, a gate circuit across the secondary winding of the transformer, and a threshold detector connected to respond to the signal which appears at the point between the transformer primary winding and the impedance. In concept, the transformer primary winding and the impedance form a nonresonant voltage divider network, the quotient voltage of which is dependent on the level of impedance which is reflected into the transformer primary winding from the transformer secondary winding. Such reflected impedance, and therefore the operation of the threshold detector, is influenced by opening and closing the gate circuit. The gate circuit is operated by the circuit being monitored; and such gate circuit provides isolation between the monitored and monitoring circuits. Since each transformer primary winding cooperates with its own threshold detector, and since the monitored circuits are coupled to the secondary winding side of respective monitoring circuits, such monitoring circuits are, of necessity, assuredly electrically isolated from each other. Thus, a fault in one monitored circuit cannot, in any way, cause actuation of any except its own monitor circuit.

An object of the invention is to provide an improved form of signal detector.

Another object of the invention is to provide a circuit for monitoring the operation of another circuit.

Another object of the invention is to provide a circuit for checking whether a given circuit element is conducting, or not, an alternating, or direct, current.

Another object of the invention is to provide a signal detector that makes use of a threshold detector in combination with a voltage divider network, such voltage divider network including an impedance and a transformer winding; and such signal to be detected being applied to actuate a circuit including another winding of said transformer.

Another object of the invention is to provide a monitor circuit for use with switches adapted to handle alternating and direct currents, whether such switches be normally open or normally closed.

Another object of the invention is to provide, in combination, a plurality of monitor circuits which are so standardized that they, respectively, can determine the actuation of respective AC and DC-carrying switches, even when such actuation is intermittent, and which of such monitor circuits was the first to fail.

The invention will be described with reference to the figures, wherein

FIG. 1 is a simplified diagram useful in describing the main concept which is embodied in apparatus according to the invention, FIG. 2 is a schematic wiring diagram illustrating one embodiment of the invention, and FIG. 3 is a schematic wiring diagram, partially in block form, illustrating a presently preferred embodiment of the invention.

As used herein, the term "transformer" may be taken to mean any electrical device which employs inductive coupling between first and second portions thereof, whether such transformers have separate primary and secondary windings; or are autotransformers; or are variations or combinations of the aforementioned.

With reference to FIG. 1, the primary winding 10 of a transformer 12 is connected in series with an impedance 14 to form a voltage divider network, A gate circuit 16 connects across the secondary winding 18 of the transformer 12; and a threshold detector 20 —which may, for example, be a simple neon bulb —is connected to receive the quotient signal appearing at the point P of the voltage divider network. An AC voltage is applied across the contacts 22, 24, one of which contacts is selectively electrically grounded to provide one, or another, AC phase.

OPERATION I (i.e. assuming that the gate circuit 16 is normally closed): The contact 24 is grounded. Since the transformer secondary winding 18 is not conducting, the impedance of the transformer primary winding 10 is large; and therefore the AC voltage drop across the impedance 14 is low and insufficient to actuate the threshold detector 20 (i.e. the neon bulb does not light). In the event that the gate circuit 16 opens, the impedance reflected into the primary winding 10 from the secondary winding 18 causes the voltage across the primary winding to drop; and corollarily, the voltage across the impedance 14 rises to an amount sufficient to actuate the threshold detector 20 (i.e. the neon bulb lights), thereby indicating that the gate circuit 16 is open.

OPERATION II (i.e. assuming that the gate circuit 16 is normally open): The contact 22 is grounded. Since the secondary winding 18 is conducting, there is little impedance reflected into the primary winding 10 from the secondary winding 18. Therefore, the AC signal applied across the contacts 22, 24 is mostly developed across the impedance 14, the potential at the point P being practically at ground, and being too low to actuate the threshold detector 20. In the event that the normally open gate circuit 16 closes, the impedance across the primary winding 10 rises, causing a redistribution of the AC across the contacts 22, 24, and causing the potential at the point P to rise to actuate the threshold detector 20.

As above-noted, the circuits of FIGS. 2 and 3 both incorporate the concept of employing reflected impedance into a transformer primary winding to redivide a voltage for threshold detector actuation, the circuit of FIG. 3 being, however, presently preferred because it represents a further standardization of equipment; and permits of greater versatility (say for detecting the intermittent closing of a normally open switch) and in so doing facilitates the inclusion of a first-to-fail feature.

Referring initially to FIG. 2, the operations of consoles 26, 28, and 30, as represented respectively by a normally closed switch 32, a normally open switch 34, and a normally nonconducting impedance 36, are to be monitored. In the discussion which follows, it should be borne in mind that the invention is not concerned with the respective states of passive elements, but rather with the respective states of active elements: viz, that the normally closed switch 32 is, in fact, conducting a current; that the normally open switch 34 will, in fact, conduct a current when closed; and that the impedance 36 will conduct a current when some element, or the like, within the console 30 gets actuated.

A pair of leads 38, 40 are brought directly to the respective sides of the switch 32, and such leads are connected to the input terminals 42, 44 of a monitor circuit 46 according to the invention. Since the switch 32 is normally closed, the excitation of the circuit 46 is in accordance with OPERATION I above, viz that a contact 48 of the circuit 46 is grounded, and that a contact 50 thereof is connected to an AC source. A transformer 12' has its primary winding 10' connected in series with a resistor 14' and their respective free ends are connected to the contacts 50 and 48.

The contacts 42, 44 of the monitor circuit 46 connect across (via a high impedance 49 for isolating the monitor circuit 46 from the console 26) the cathode-control electrode circuit of a control rectifier 16'; and the anode and cathode of the control rectifier 16' are excited by means of a rectifier circuit 52 which is connected across the secondary winding 18' of a transformer 12'. A switch 54 is closed to place a capacitor 56 across the cathode-anode circuit of the control rectifier 16', and such capacitor serves to keep the control rectifier 16' conducting once conduction therethrough has been started.

A neon lamp 20', serving as threshold detector, has the quotient signal which appears at the point P' applied across it.

The cooperation of the switch 32 and monitor circuit 46 is as follows: With the switch 32 in its normally closed position, the potential across the contacts 42, 44 is zero; and therefore the control rectifier 16' is not gated into conduction. Such being the case, the secondary winding 18' impedance is high, and hence the applied AC across the contacts 48, 50 is mostly developed across the transformer primary winding 10'. In other words, the potential at the point P' is too low to light the neon bulb 20'. Should the switch 32 open, a potential (whether AC or DC will appear across the contacts 42, 44 causing the control rectifier 16' to be gated into conduction. In the event that the normally closed switch 32 drops closed after having been once opened, the control rectifier 16' will continue to conduct because the pulsating DC output of the rectifier 52 is so filtered (by means of the capacitor 56) that the DC flow through the control rectifier 16' is prevented from dropping to zero. When the control rectifier 16' first starts to conduct, the impedance seen by the primary winding 10' of the transformer 12' lowers; and therefore the voltage across the contacts 48, 50 redivides to cause the quotient signal appearing at the point P' to rise to above the threshold level necessary to light the fault-indicating bulb 20'. Thus, even if the normally closed switch 32 were to close intermittently, or remain open, a fault would continue to be registered by the circuit 46.

To monitor the operation of the normally open switch 34, a monitor circuit 60 (exactly like the circuit 46) is provided. The circuit 60, however, has its switch 54 opened; and in accordance with OPERATION II above, has its contact 50 grounded (rather than its contact 48).

The cooperation of the circuit 60 and the switch 34 is as follows: Whether an AC or a DC is applied across the switch 34, a gating signal is applied to the control electrode of the control rectifier 16' so long as the switch 34 is open. The gating signal causes the control rectifier 16' of the circuit 60 to conduct, which conduction, in turn, causes the secondary winding 18' impedance to be low. Such low impedance, when reflected into the primary winding 10' of the circuit 60 causes the quotient voltage which appears at the point P' to be just a little above ground potential. Should a fault occur in the circuit 28 to cause the switch 34 to close, conduction through the control rectifier 16' will stop. This is because the pulsating DC applied to the anode of the control rectifier 16' will periodically drop to zero, the capacitor 56 of the circuit 60 being disconnected and unable to maintain DC flow through the control rectifier 16'. Thus, when a fault occurs to close the switch 34, the control rectifier 16' stops conducting and causes the transformer secondary winding 18' to reflect a high impedance into the transformer primary winding 10'. The voltage across the contacts 48, 50 therefore redivides to raise the point P' well above the threshold needed to light the bulb 20'. (In the event that the normally open switch 34 were to close, even briefly, in response to an intermittent fault within the circuit 28, the bulb 20' of the circuit 60 would go out only so long as such fault were present, a matter to be discussed later in connection with the preferred embodiment as indicated in FIG. 3.)

The normally nonconducting circuit element of the circuit 30 is akin to a normally open switch and, therefore, is connected to a monitor circuit 62 in the same manner that the switch 34 was connected to the monitor circuit 60, the switch 54 and the contact 50 of the circuit 62 being respectively open and grounded.

To indicate which of the monitored circuits 26, 28 and 30 was the first to fail, a circuit 64 is appropriately connected to the circuits 46, 60 and 62. The circuit 64 includes a respective neon lamp 66, 68 and 70 for each circuit 46, 60 and 62, and such lamps are connected in series with the anode-cathode circuits of respective control rectifiers 72, 74 and 76. Each lamp and control rectifier combination is DC-excited through a common register 78; and each control electrode of each control rectifier is adapted to receive a gating signal when the threshold detector 20' of its respective monitor circuit is actuated. Thus, when the neon bulb 20' of, say, the monitor circuit 60 is not lit, there is no signal applied to gate the control rectifier 74 into conduction. In the event, however, that the bulb 20' of the circuit 60 lights to indicate a fault in the circuit 28, prior to any fault occurring in either of the circuits 26 and 30, the control rectifier 74 is gated into conduction, causing the lamp 68 to light (and to remain lit, even though the switch 34 were to open, this being because the control rectifier 74 is DC-excited) to indicate that the circuit 28 failed first. As soon as the amp 68 lights, the point C which is common to all of the first-to-fail lamps 66,68 and 70, is placed practically at ground potential to assure tat neither the lamp 66 nor the lamp 70 may light once the lamp 68 lights.

The apparatus of FIG. 3, as above-noted, embodies the invention in its presently preferred form in that, for example, the need for a capacitor 56 to sustain control rectifier conduction under certain conditions, but not under others, is obviated. In so standardizing a monitor circuit as in FIG. 3, the invention permits of a continuous failure indication of, say, a normally open switch that closes briefly and then reopens, doing so in a way that used and/or facilitates the implementation of a first-to-fail feature.

Referring to FIG. 3, it will be noted that the circuit thereof corresponds largely to the circuit of FIG. 2. However, whereas the element 20' of FIG. 2 was both a threshold detector and an indicator, the circuit of FIG. 3 employs an element 20'' for threshold detection purposes only; and the threshold detector 20'' may take any well-known form, including that of a neon bulb.

The output of the threshold detector 20'' is applied to gate a direct current through a control rectifier 80 to illuminate a fault-indicating lamp 82. And the same control rectifier 80 which is used for fault indication purposes is also employed here to excite a first-to-fail indicator 84. Switches 86 are provided to facilitate reversing the AC excitation which is applied to the contacts 48, 50, thereby to allow the monitoring of normally open and normally closed switches.

Operation of the circuit of FIG. 3 is as follows: With a normally closed switch connected across the contacts 42, 44, the switches 86 are set to their upper positions. So long as the monitored switch (e.g. switch 32, FIG. 2) remains closed, the threshold detector 20'' produces no output. Should the monitored switch 32 open, however, the control rectifier 16' starts to conduct a pulsating DC and such pulsating DC causes a pulsating redivision of the voltage across the primary winding 10' of the transformer 12'. Therefore, the threshold to be detected is periodically exceeded; and at the instant that such threshold is first exceeded, the threshold detector 20'' produces an output signal to turn on the control rectifier 80, thereby causing the lamp 82 to light; and if the lamp 82 in question was the first such lamp to light, its corresponding lamp 84 would also light, placing at such time all of the other lamps 84 practically at ground potential (point C') to prevent their illumination.

Should the circuit of FIG. 3 be employed to monitor a normally open switch, the lamp 82 will light whenever such switch closes; and it will continue to remain lit even if such switch reopens. In monitoring a normally open switch, (e.g. switches 34, FIG. 2), the switches 86 are set to their lower positions. Since a normally open switch 34, when open, has a potential across it, the control rectifier 16' conducts a pulsating DC provided by the rectifier 52, to cause the point P' periodically to go to ground potential, and thus the threshold signal necessary to gate current through the indicator lamp 82 does not develop. Should the normally open switch 34 in question close, the pulsating DC through the control rectifier 16' will stop during such closure, causing the voltage across the contacts 48, 50 to redivide so that the point P' rises to above the necessary threshold potential level. Once the threshold detector 20'' produces an output to gate the indicator lamp 82 into conduction, such lamp will remain conducting (this being because it is DC-excited) even though the normally open switch 34 in question reopens to cause the control rectifier 16' again to carry a pulsating DC i.e. even though the threshold detector 20'' ceases to produce an output signal. It is seen therefore, that with this, the presently preferred form of the invention, a common gate circuit 80 is used for both failure indication purposes, and for first-to-fail indication purposes; and also that a standardized form of circuit (i.e. one not requiring the selective use of a capacitor) is provided to monitor the operation of either a normally open or a normally closed switch, and to indicate whenever either such switch, even intermittently, became abnormally disposed.

The invention has been described in detail with particular reference to a preferred embodiment thereof, but it will be understood that variations and modifications can be effected within the spirit and scope of the invention as described hereinabove and as defined in the appended claims.

I claim:

1. Signal detector apparatus comprising
   a. first and second mutually inductive elements,
   b. a resistor serially connected to said first of said elements and forming therewith a nonresonant voltage divider network,
   c. means for applying an AC signal across the combination of said first element and said resistor,
   d. normally closed gate circuit means connected across the second of said elements for completing the circuit which includes gate circuit means and said second element,
   e. means for applying the signal to be detected to said gate circuit means to actuate and open said gate circuit means, and
   f. threshold detector means connected to receive and respond to the divided voltage which appears at the junction between said first element and said resistor when such voltage is of a certain predetermined amount, the amplitude of such divided voltage being dependent on whether the signal to be detected gates, or not, the said gate circuit means to complete the circuit which includes the said gate circuit means and said second element.

2. The apparatus of claim 1 wherein said first and second mutually inductive elements are respectively the primary and secondary windings of a transformer, and wherein said gate circuit means includes a control rectifier, the anode and cathode of which are connected in series with the transformer secondary winding, and wherein the signal to be detected is applied to the control electrode of the said control rectifier.

3. The detector apparatus of claim 2 in combination with a plurality of other such detector apparatuses, each detector apparatus being provided with means for connecting its respective control electrode-cathode circuit across a respective pair of circuit contacts the conduction therebetween of which is to be monitored, said respective pairs of circuit contacts being nonserially connected with each other and wherein said combination of detector apparatuses includes means for AC-exciting the respective voltage divider network of each detector apparatus with one or an opposite phase depending on whether the respective circuit contacts which are to be monitored are adapted to be normally conducting or normally nonconducting.

4. The apparatus of claim 2 wherein said threshold detector means is a neon lamp.

5. The apparatus of claim 2 wherein said apparatus includes a second control rectifier the anode-cathode circuit of which is serially connected to an indicator lamp, means for DC-exciting the anode-cathode of said second control rectifier, and wherein the control electrode of said control rectifier is connected to receive the output signal from said threshold detector means.

6. The detector apparatus of claim 5 in combination with a plurality of other such detector apparatuses, each detector apparatus being provided with means for connecting its respective control electrode-cathode circuit across a respective pair of circuit contacts, the conduction therebetween of which is to be monitored, and wherein said combination of detector apparatuses includes means for AC exciting the respective voltage divider network of each detector apparatus with one or an opposite phase depending on whether the respective circuit contacts being monitored are normally conducting or normally nonconducting, and wherein each detector apparatus further includes a second lamp in parallel with its respective indicator lamp and in series with the cathode-anode circuit of its respective second control rectifier, a common impedance serially connected to said second lamps, and wherein said combination of detector apparatuses further includes means for DC exciting each of said second lamps through said common impedance.